United States Patent
Boyd et al.

(10) Patent No.: US 8,847,930 B2
(45) Date of Patent: Sep. 30, 2014

(54) ELECTRICALLY CONDUCTIVE TOUCH PEN

(75) Inventors: Geoffrey Arthur Coleridge Boyd, San Jose, CA (US); Erik A. Holverson, Hoffman Estates, IL (US); Scott Wilson, Chicago, IL (US)

(73) Assignee: Wimo Labs LLC, Chicago, IL (US)

( * ) Notice: Subject to any disclaimer, the term of this patent is extended or adjusted under 35 U.S.C. 154(b) by 66 days.

(21) Appl. No.: 13/300,100

(22) Filed: Nov. 18, 2011

(65) Prior Publication Data

US 2013/0038579 A1 Feb. 14, 2013

Related U.S. Application Data

(60) Provisional application No. 61/476,309, filed on Apr. 17, 2011.

(51) Int. Cl.
| | | |
|---|---|---|
| *G06F 3/033* | (2013.01) | |
| *B43K 23/008* | (2006.01) | |
| *B43K 29/00* | (2006.01) | |
| *B43K 7/00* | (2006.01) | |
| *B43K 29/10* | (2006.01) | |
| *B43K 7/02* | (2006.01) | |
| *B43K 25/02* | (2006.01) | |
| *B43K 29/02* | (2006.01) | |
| *B43K 7/12* | (2006.01) | |
| *G06F 3/0354* | (2013.01) | |

(52) U.S. Cl.
CPC ................ *B43K 7/02* (2013.01); *B43K 23/008* (2013.01); *B43K 29/00* (2013.01); *B43K 7/005* (2013.01); *B43K 29/10* (2013.01); *B43K 25/028* (2013.01); *B43K 29/02* (2013.01); *B43K 29/004* (2013.01); *B43K 7/12* (2013.01); *G06F 3/03545* (2013.01)
USPC ......................................... 345/179

(58) Field of Classification Search
USPC ................................... 345/179–183
See application file for complete search history.

(56) References Cited

U.S. PATENT DOCUMENTS 3,501,225 A * 3/1970 Martin et al. ................. 401/198
5,635,682 A * 6/1997 Cherdak et al. ............ 178/19.01
(Continued)

FOREIGN PATENT DOCUMENTS

| KR | 10-0990755 | 10/2010 |
| KR | 100990755 | * 10/2010 |
| WO | WO 2011008533 | 1/2011 |

OTHER PUBLICATIONS

Webpage from Amazon.com for "Dr. Grip 1+1 Stylus Pen Combo (does not work with iPad/iPhone)" printed from http://www.amazon.com/Grip-Stylus-Pen-Combo-iPhone/dp/B0015PJHMQ on Nov. 1, 2011.

(Continued)

*Primary Examiner* — Alexander S Beck
*Assistant Examiner* — Kirk Hermann
(74) *Attorney, Agent, or Firm* — Neal, Gerber & Eisenberg LLP

(57) ABSTRACT

A combination writing pen and stylus is disclosed. The device has an internal ink cartridge deployable through a hole in the stylus tip. The stylus tip extends from a sleeve that is formed of a conductive elastomeric material. The sleeve extends up a rigid shaft of the device such that it contacts a sufficient ground. The stylus tip may be coated with a protective material that adjusts the coefficient of friction and prevents carbon deposits on the touch screen. A sufficient contact patch is achieved to simulate a human finger so as to overcome false positives from common touch screen logic. This is done by altering tip geometries around an air cavity within the sleeve.

21 Claims, 15 Drawing Sheets

(56) References Cited

U.S. PATENT DOCUMENTS

| | | | |
|---|---|---|---|
| 5,877,459 A * | 3/1999 | Prater | 178/19.06 |
| 5,913,629 A | 6/1999 | Hazzard et al. | |
| 6,050,735 A | 4/2000 | Hazzard | |
| 6,390,706 B1 * | 5/2002 | Yokouchi et al. | 401/104 |
| 6,439,791 B1 * | 8/2002 | Takeuchi et al. | 401/195 |
| 7,567,242 B2 | 7/2009 | Perkins | |
| 7,607,849 B2 | 10/2009 | Barker | |
| 2005/0286962 A1 * | 12/2005 | Cheng | 401/6 |
| 2006/0062628 A1 * | 3/2006 | Kostecki et al. | 401/6 |
| 2006/0239761 A1 | 10/2006 | Cetera | |
| 2007/0110496 A1 * | 5/2007 | Cetera | 401/6 |
| 2008/0030486 A1 | 2/2008 | Cook | |
| 2008/0297491 A1 * | 12/2008 | Adkins | 345/179 |
| 2009/0262637 A1 * | 10/2009 | Badaye et al. | 369/126 |
| 2010/0021022 A1 | 1/2010 | Pittel | |
| 2010/0214252 A1 * | 8/2010 | Wu | 345/174 |

OTHER PUBLICATIONS

International Search Report and Written Opinion of the International Searching Authority for PCT/US2012/033288, dated Nov. 1, 2012.

* cited by examiner

ELECTRICALLY CONDUCTIVE TOUCH PEN

CROSS-REFERENCE TO RELATED APPLICATION

This is a non-provisional patent application claiming priority to U.S. Provisional Patent Application No. 61/476,309, filed on Apr. 17, 2011, entitled "ELECTRICALLY CONDUCTIVE TOUCH PEN." The provisional application is incorporated herein by reference in its entirety.

TECHNICAL FIELD

The present invention relates to marking utensils and computer input devices. More specifically, the invention is directed at multi-function writing devices that can physically mark on traditional writing surfaces and can also digitally mark on, or be used as other input means in association with, computerized digital displays.

BACKGROUND OF THE INVENTION

Historically, a stylus is an elongated, sharp, pointed instrument used for writing, marking, and engraving. More recently styli are being modified for use with inputting data to computer devices.

In the context of touch screen computer interfaces, a stylus provides many benefits to users. For example, a user can more accurately use a stylus for computer touch screen input than they can their own finger. The accuracy is due to the fact that a computer stylus has a smaller tip than do most human fingers, and so can achieve an accordingly higher degree of accuracy on a touch screen. This increase in accuracy, in turn, allows for smaller user interface elements, and provides increased ease of use for many users. Additionally, some users prefer to use a stylus simply to avoid depositing the natural oils from their hands on the screen.

One disadvantage to stylus use is that it necessitates carrying an additional personal item. This is especially problematic given the already large number of personal items commonly carried by individuals such as: keys, pens, glasses, wallet, and a smart phone. One solution to this problem is the combination pen and stylus.

A touch screen is, generally speaking, a combination touchpad and computer display that can detect the presence and location of a touch within the display area. Although this patent application will refer generally to touch screens, much of the technology disclosed herein will work with other similar human machine interfaces, such as a touchpad. There are many touch screen technologies including resistive, capacitive, surface acoustic wave, infrared, strain gauge, optical imaging, dispersive signal technology, inductive sensor systems that may be placed under an LCD, and acoustic pulse recognition. Of these, the first two (resistive and capacitive) are the most common.

Resistive touch screens have been used on smart phones and tablet computers. An example of a resistive touch screen is the PALM PILOT®. Resistive touch screens comprise two very slightly separated optically transparent sheets, at least one flexible, and both coated with a transparent electrically conductive material. Normally, there is no contact between the two sheets, however, when the surface of the touch screen is touched at a point by a stylus or other object, the two sheets contact each other at that point, registering to the related computer system the precise location of the touch. This type of touch screen can sense contact from nearly any solid object pressed against it. Accordingly, nearly any pointed object can serve as a stylus. Combination pen/stylus devices already exist for resistive touch screens. For example, the Dr. Grip 1+1 Stylus Pen Combo manufactured by PILOT® is a combination ballpoint pen and stylus for use with resistive touch screens. The tips of such devices are typically plastic or a similar polymer, so as not to damage or scratch the screen.

Capacitive touch screens are quickly replacing resistive touch screens, and are used with many modern small digital devices. For example, the newer iPhones® and iPads® from APPLE® are all equipped with capacitive touch screens. Capacitive touch screens generally comprise a flat insulative transparent sheet such as glass having an inside portion coated with a transparent conductor such as indium tin oxide (ITO), films made from graphene (carbon nanotubes), or other suitable material. Conductive materials that touch or are in very close proximity to this type of touch screen alter the electrostatic field of the screen, thereby creating a registerable change in capacitance. At the physical level a changing electrical potential difference causes a flow of electrons as an alternating current (AC) through a capacitor and it is this current flowing to a sink or source of electrons that is detected by the touch screen device. For some conductive materials such as biological tissue, these charged carriers could be predominantly ions—cations and/or anions. This sink or source of electrons, sometimes called a "ground" is necessary to complete the flow of electrons in most types of capacitive touch screens that can be activated by human touch. The effectiveness of a body as a ground is directly proportional to the product of its volume and conductivity. For alternating current and complex materials such as biological tissue it is also dependent on the frequency of the alternating current.

The most common input device used with capacitive touch screens is the human finger. Although the conductivity of the human body is not particularly high, its relatively high volume nevertheless allows it to act as an effective ground. At low frequencies typical biological tissues have conductivities on the order of 1 to 10 S/m (Siemens per meter) compared to metals like copper and aluminum which are 58 and 35 MS/m (million Siemens per meter) respectively. Traditional plastic or polymer-based styli are not effective in marking on capacitive touch screens because they are not sufficiently conductive. The problem is exacerbated if the user of the stylus is wearing gloves or has extremely dry skin. This is common in colder environments, where people may often need to mark on handheld devices while outside. These situations are problematic because the user is further insulated from the stylus which prevents the flow of alternating current to the human body ground. Though other materials providing better conductivity could be used, such as aluminum or other metals, they would likely scratch or otherwise damage the touch screen. Furthermore, many capacitive touch screens are tuned to detect inputs from human fingers and thus may not register a hard pointed input, simply due to the goal of minimizing false inputs.

One solution that enables a stylus to be used with a capacitive touch screen is the use of conductive rubber or a similar conductive elastomeric material. Conductive rubber is a rarer and more expensive form of rubber that contains suspended graphite carbon, carbon nanotubes, nickel or silver particles. Its electrical impedance decreases when it is compressed, and the capacitance increase as a result of the larger surface area in contact with the touch screen, thereby making it useful for capacitive touch screen applications. In addition, the rubber durometer can be set so as to deform at its tip in a manner similar to the deformation exhibited by a human finger as it presses down on a flat surface.

What is missing in the present art is a writing device that can seamlessly transition between marking on paper and marking on a capacitive screen. Such combinations for resistive-screen styli like the PILOT® pen proved easy because a rigid, non-conductive end of a pen could be used. For capacitive screens, no such device exists in the prior art because of the challenges with mounting a writing pen within a sufficiently flexible, sufficiently conductive material.

SUMMARY OF THE INVENTION

The invention described herein may be operated as either a pen for writing on paper or other surfaces, or as a stylus for interacting with a capacitive touchpad or touch screen. The device is easy to use, and conversion between the two modes is accomplished by any standard retractable pen-type interface, such as a push button or twisting movement. An embodiment of the device works even if the user is effectively insulated from the electrically conductive stylus pen, e.g., if the user is wearing gloves. The device comprises electrically conductive rubber with a proper screen-protective coating, and features a compliant tip which generates the proper contact area when the stylus is depressed against a touch screen.

According to certain embodiments, the invention provides an electrically conductive touch pen that has a conductive, flexible tip. The invention attempts to model the contact area of a human finger with the flexible tip to improve conductivity and simulate the touch of a human fingertip. It is this contact area that determines the electrical impedance (i.e. capacitance in this case), because the substrate of the touch screen is usually a very good insulator (e.g., glass). Because capacitance is directly proportional to the common area of the conducting surfaces of the touch screen on the one hand and the conductive rubber on the other, a large contact patch is desirable.

It is an object of the present invention to provide an electrically conductive touch pen which may be employed by a user with very dry skin or who is wearing gloves, e.g. a user who does not make conductive contact with the combination pen and stylus.

It is an additional object of the invention to provide a stylus rubber tip in electrical contact with a good conductor such as, but not limited to, copper or aluminum of such mass that the product of its electrical conductivity and volume, at the frequency of operation, is functionally equivalent to that of the human body.

It is an additional object of the invention to provide a pen/stylus combination, wherein the pen deploys and retracts from within a housing created by the stylus material, and wherein the housing comprises a sufficient air cavity to promote a proper contact area with the touch screen when the pen is retracted.

It is an additional object of the invention to provide a plurality of removable styli caps for a writing device that can be placed over the writing device, the plurality of caps having an adjustable range of end tip pliability so as to adjust the conductivity and contact patch for different environmental conditions and touch screen device characteristics.

While certain features and embodiments are referenced above, these and other features and embodiments of the present invention will be, or will become, apparent to one having ordinary skill in the art upon examination of the following figures and detailed description. It is intended that all such additional embodiments and features included within this description, be within the scope of the present invention, and be protected by the accompanying claims.

BRIEF DESCRIPTION OF THE FIGURES

The present invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
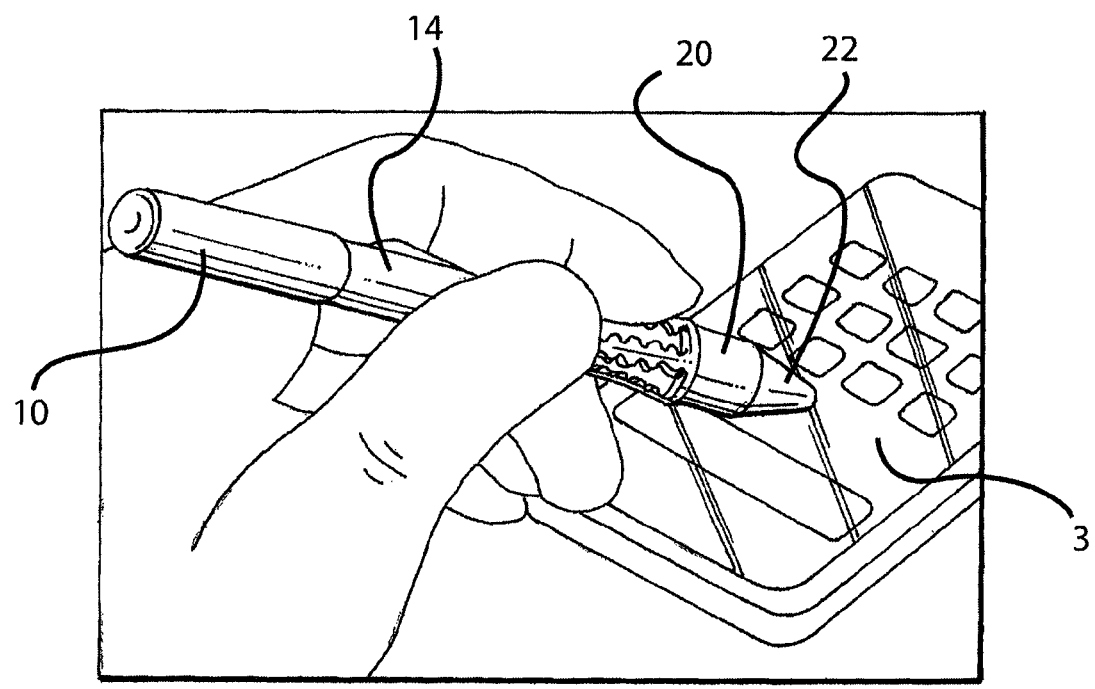
FIG. 1 is an environmental view of the electrically conductive touch pen with the writing tip retracted and the stylus in operation on a touch screen in accordance with a certain embodiment.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood to one of ordinary skill in the art.

Figure 1A:
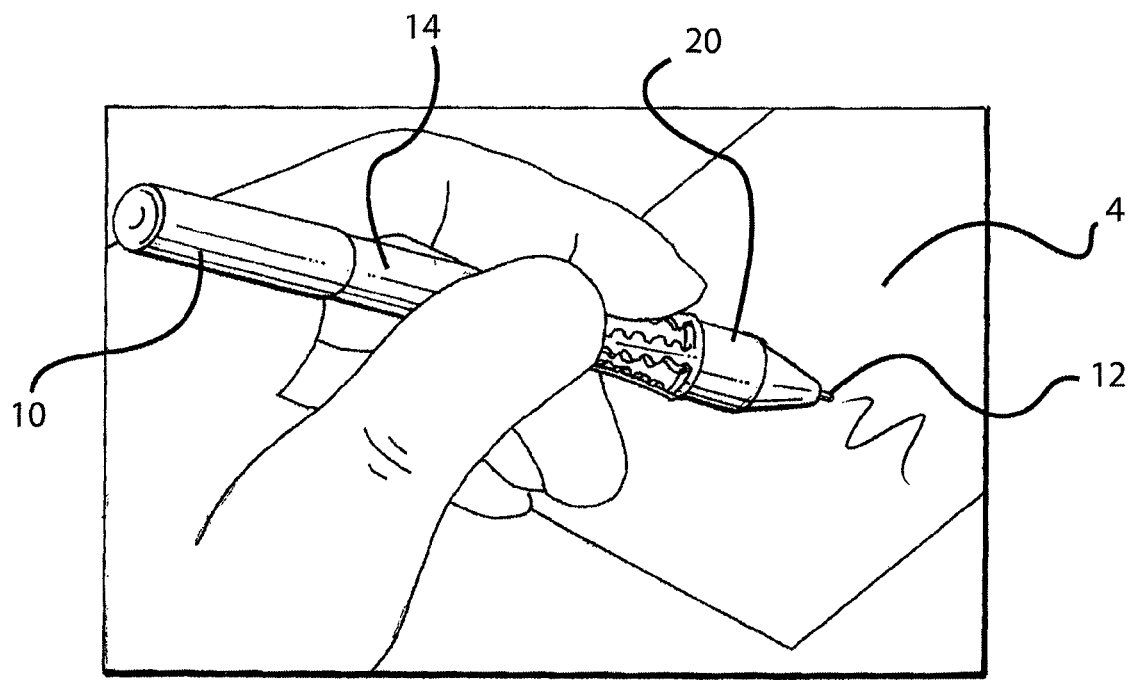
FIG. 1A is an environmental view of the electrically conductive touch pen with a writing tip deployed in accordance with a certain embodiment.

FIGS. 1 and 1A are environmental views showing a touch pen 10 in use with a touch screen 3 and a sheet of paper 4, respectively. For purposes of this application, where a touch screen is shown, it will be presumed that it is a capacitive type touch screen as defined in more detail in the background section. In FIG. 1, the touch pen, which may also be referred to herein as an input device or marking device, is in a first configuration where the writing tip 12 is in a stored or retracted position within the stylus tip 22. In this first configuration, the touch pen 10 is prepared to mark on or otherwise interact with the touch screen 3. In FIG. 1A, the writing tip 12 has been deployed to an operating position where it extends from the stylus tip. In this second configuration, the touch pen 10 is prepared to mark on a traditional writing surface such as paper 4.

As shown, the combination touch pen 10 comprises an elongated shaft 14 having a writing or marking end (the distal end) and an opposite end (the proximate end). Though not shown, the proximate end may be equipped with various features such as a mechanism for deploying the writing tip 12, a light, an eraser (if the tip 12 is lead-based), etc. The pen also comprises a sheath or sleeve 20 that covers and extends beyond the distal end of the shaft 14. This sleeve 20 is formed of an elastic material with conductive properties that are sufficiently resilient, yet rebound to an original molded shape after moderate deformation. Non-limiting examples of such material are silicone rubber, natural latex rubber, thermoplastic elastomers (TPE), thermoplastic vulcanizates (TPE-v), thermoplastic urethanes (TPU), and ethylene-vinyl acetates (EVA), each having additives such as carbon, copper, nickel or silver fragments. Different variations of these materials and additives may be used to affect the appearance, color and translucence of the sleeve. Where the term "rubber" is used herein, it will be understood that any of the above materials could be substituted.

As an alternative to the metal fragments, a metal mesh or other configuration (not shown) could be used as an insert to the mold such that the elastomeric compound would be formed around and cover over it. In this case, the mesh would be thin enough to be sufficiently flexible and may not extend all the way to the end of the style tip 22. In the embodiment shown, the sleeve 20 extends some distance up the shaft 14 such that it is gripped by the hand of a user. In this fashion, shaft 14 may be formed of any rigid material, whether conductive or not. For example, shaft 14 could be an inexpensive, non-conductive plastic or other polymer. This is because touch pen 10 is designed in this embodiment such that the conductive sleeve 20 directly contacts the user for a sufficient ground.

Figure 2:
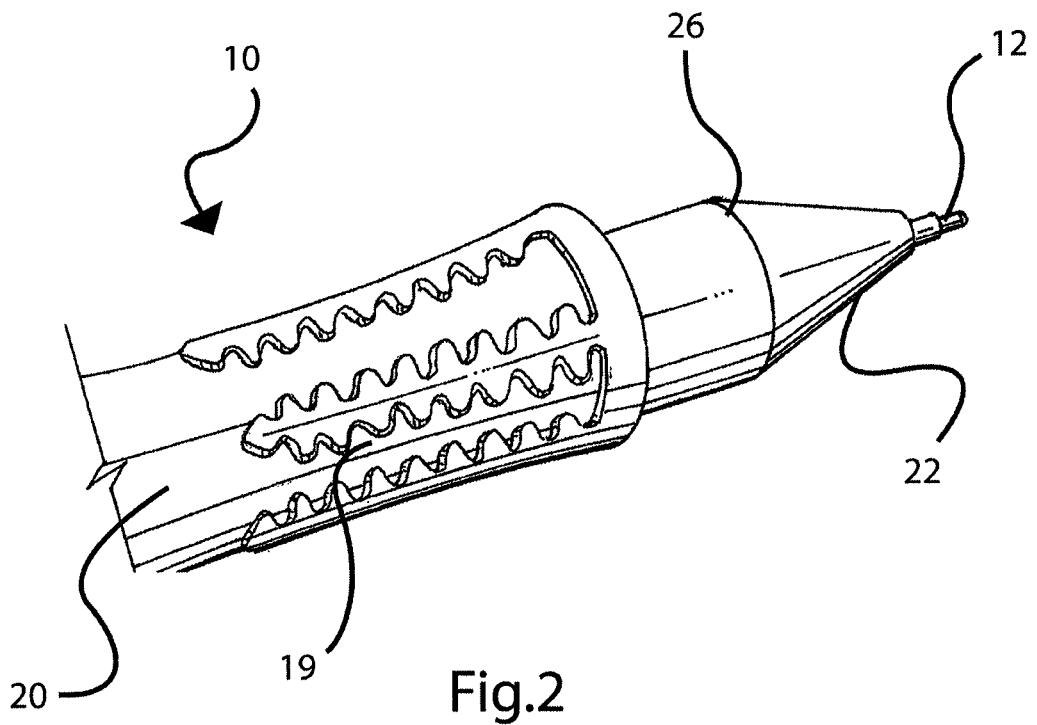
FIG. 2 is a perspective view of the electrically conducive touch pen in a first configuration according to a certain embodiment of the invention.
Figure 3:
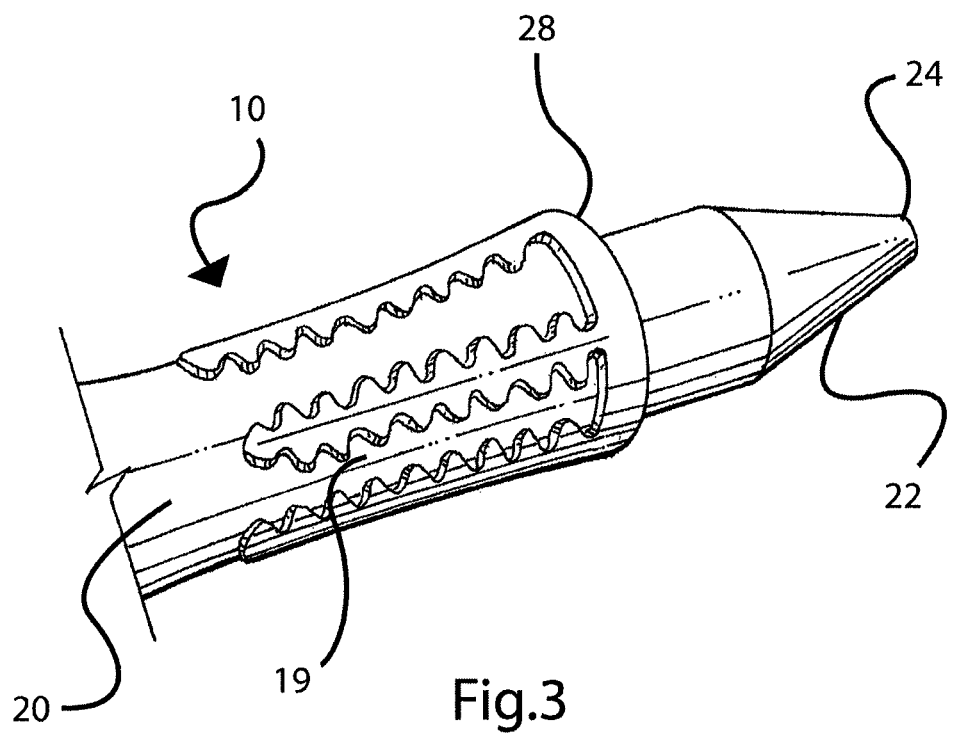
FIG. 3 is a perspective view of the electrically conducive touch pen in a second configuration according to a certain embodiment of the invention.

FIGS. 2 and 3 show closer views of the distal end of the touch pen 10. In FIG. 2, the writing tip 12 is extended through a central hole 24 along the stylus tip 22. In FIG. 3, the writing tip is retracted and the stylus tip 22 is ready to engage a touch screen. The conductive sleeve 20 expands in diameter along its out surface from the stylus tip 22 until it reaches a necking point 26. The increased diameter from the necking point 26 rearward is sized to accommodate the shaft 14 and/or other internal components of the touch pen 10, as shown in later figures. Further up the sleeve is a shoulder that expands to an even larger diameter used across a gripping section 19 of the touch pen. The gripping section may have contours, as shown, to increase comfort for a user and invite that particular portion of the touch pen 10, which is covered by the conductive sleeve, to be gripped in hand to form a ground.

Figure 4:
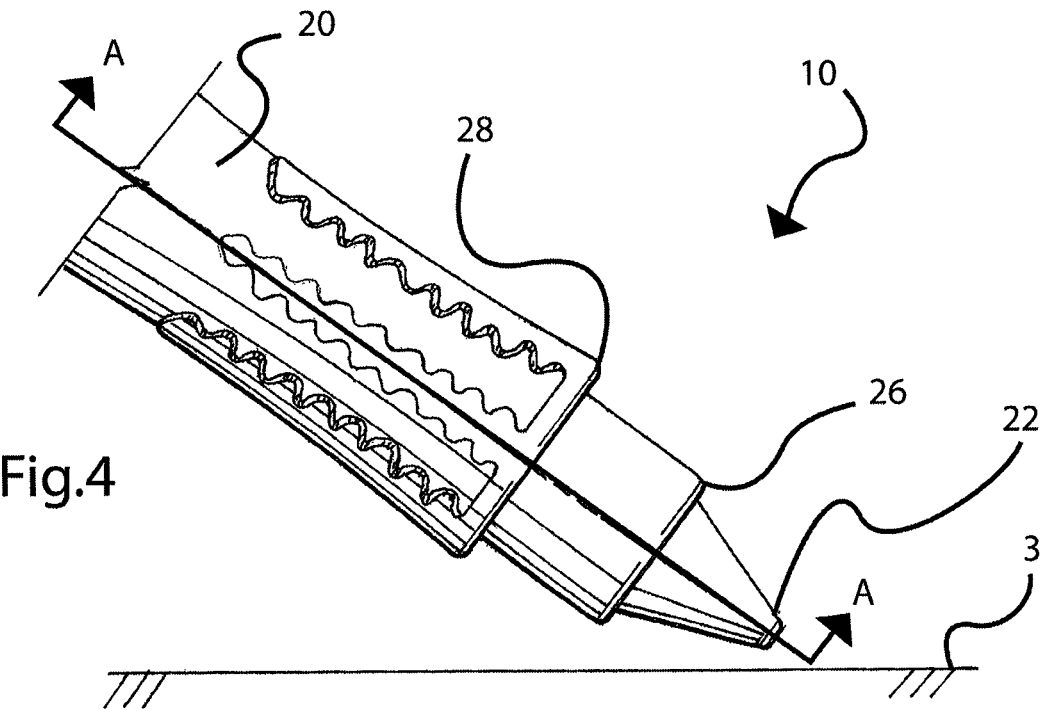
FIG. 4 is a side view of the electrically conductive touch pen in the configuration of FIG. 3.
Figure 5:
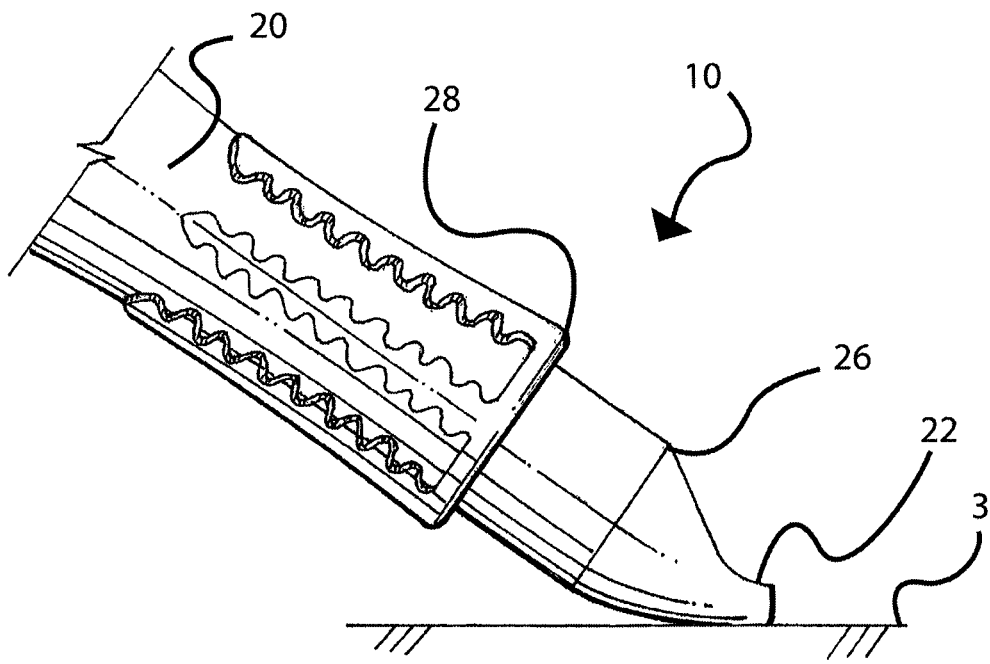
FIG. 5 is the same view of FIG. 4, but after the stylus tip has engaged a touch screen surface.

FIGS. 4 and 5 show the distal end of touch pen 10 in the stylus configuration first preparing to, and then engaging, a touch screen surface 3. The stylus tip 22 noticeably deforms when it is pressed against the surface of the touch screen 3. Again, this is by design in order to increase the contact area, and thus the capacitive properties of the elastomeric material that forms the stylus tip 22. It also increases the surface area in a manner so as to model the size and footprint of a human finger as a method to overcome touch screen logic that may be designed to ignore false (non-finger) inputs.

The stylus material should be soft and highly elastic to achieve this desired level of deformation, yet it should have exceedingly good positional memory to return to its proper shape in order to correctly position the central hole 24 from which the writing tip 12 protrudes. This challenge is exacerbated by the fact that adding the required carbon-based material to the rubber (or other elastic material as described above) to obtain the desired level of conductivity tends to stiffen the compound. To offset this factor, one method is to use softer rubber (i.e., having a lower durometer). For a solid rubber tip, or one with a narrow internal diameter hole, one needs a very soft rubber. The use of such a soft rubber is difficult due to problems with manufacture, structural effect, aesthetics, and durability. Another alternative, as shown in later figures, is to alter the wall thickness of the sleeve 20 beyond the necking point 26, thus creating an internal air cavity. As will become more clear, the ideal scenario involves a combination of proper durometer rubber and specific wall thickness variance.

Figure 6:
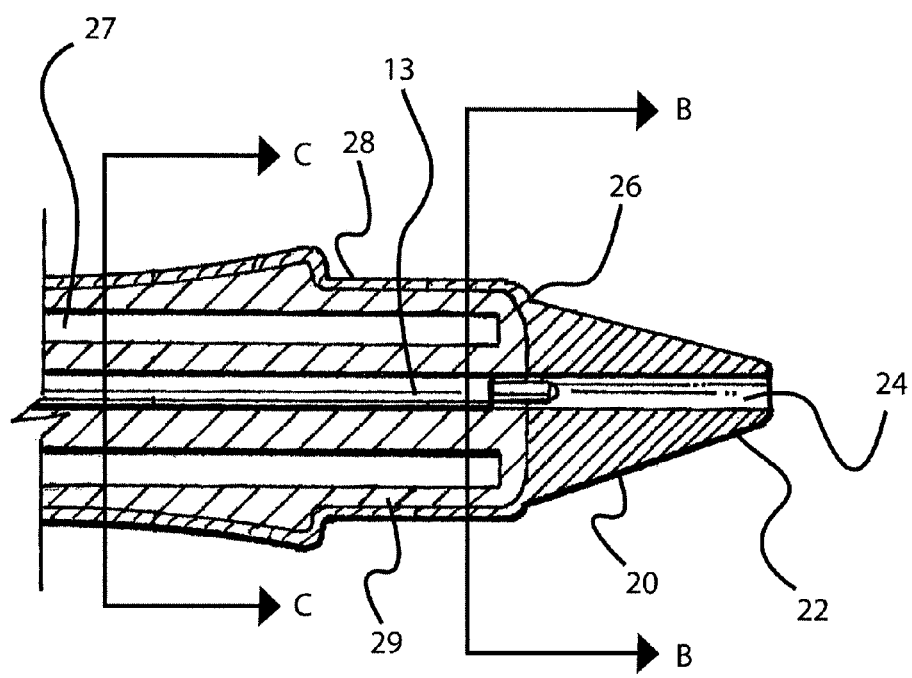
FIG. 6 is a cross sectional view taken along cutline A-A of FIG. 4, with additional cross sections 7-7 and 8-8 shown.

FIG. 6 shows a section view taken along section line A-A shown in FIG. 4. The stylus tip of FIG. 6 has a solid rubber tip with no air cavity. As explained above, it would require a very soft elastomeric material in order to have the flexibility needed to produce the desired surface contact. The sleeve 20 of FIG. 6 is comprised of the conductive cover 28 and an inner molding 29. In this case, only the conductive cover 28 portion of sleeve 20 is formed of the conductive elastic materials as described above. The inner molding 29 need not be conductive, and should be rigid or semi-rigid so as to properly house and provide support for the ink cartridge 13 that is disposed within it. The conductive cover 28 comprises the entire tip portion from the necking point 26 down to the far end of the stylus tip 22. Though it thins out considerably, the conductive cover 28 also covers the inner molding 29 as the cover extends back up toward the shaft 14 (not shown). Again, this is to ensure contact with a ground source.

In the illustrated embodiment, the molding 29 has a hollow inner core 27, so as to save unnecessary material costs. The molding 29 connects to the shaft 14 further up the touch pen 10. The conductive cover 28 may be bonded to the molding 29, or it may simply be stretched or rolled over the molding 29, adhering thereto by way of an interference fit. Either way, the conductive cover 28 and inner molding 29 may typically be removed from the shaft as one assembly. In other embodiments, the molding 29 may be replaced completely by the shaft 14, which would extend further down and be covered directly by the conductive cover 28.

Figure 7:
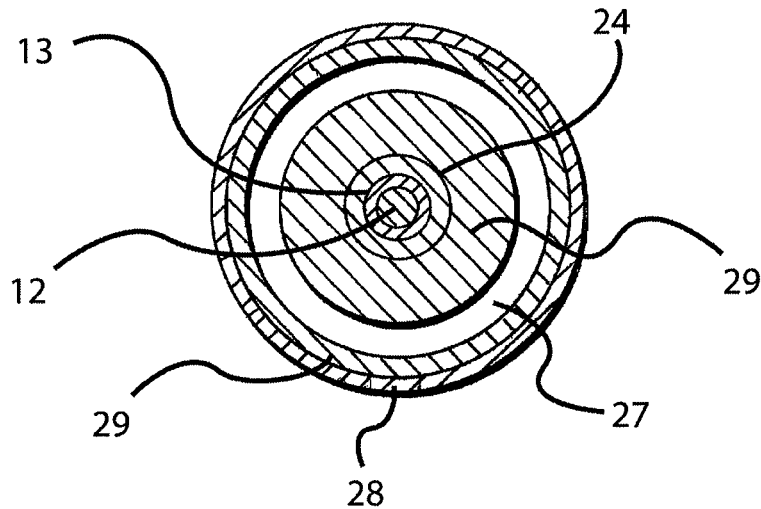
FIG. 7 is a cross sectional view taken along cutline B-B of FIG. 6.
Figure 8:
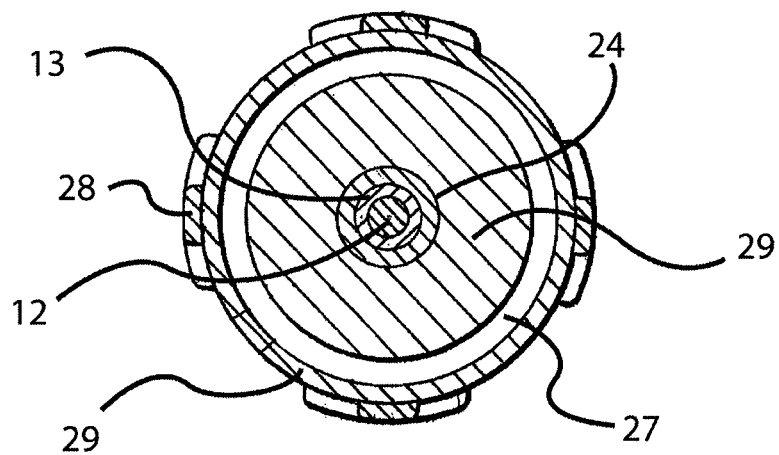
FIG. 8 is a cross sectional view taken along cutline C-C of FIG. 6.

FIGS. 7 and 8 show radial cut-away views along section lines B-B and C-C, respectively. As may be seen, the electrically conductive flexible material is continuous around the outer surface of the touch pen at the section B point, but does not completely surround the touch pen at the section C point. The conductive material content at the Section C point is sufficient to form a steady contact with a user's fingers, and is less costly than completely covering the circumference of the inner molding 29. This arrangement offers the additional advantage of providing a textured surface for the user to contact, which improves a user's ability to grip the electrically conductive stylus pen.

Figure 9:
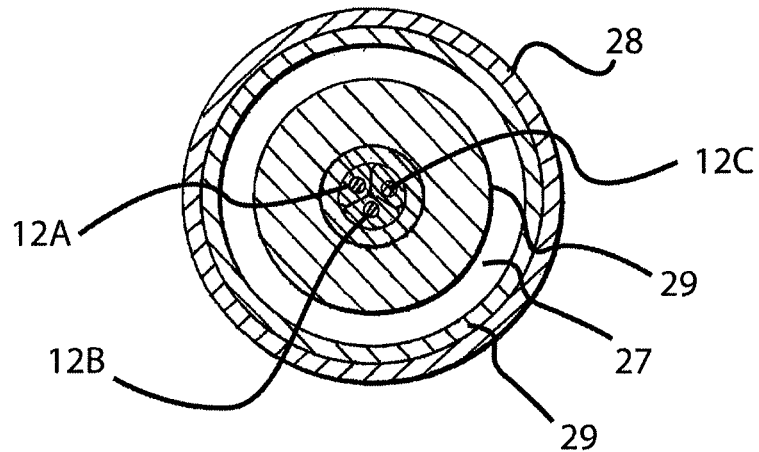
FIG. 9 is a cross sectional view similar to FIG. 7, but representing an alternative embodiment of the invention.

FIG. 9 depicts a cut-away view along line B-B of an alternative embodiment of the touch pen 10. In this alternative embodiment the single pen tip of the preferred embodiment has been replaced by a plurality of pen tips 12a, 12b, and 12c, each of which is attached to separate ink cartridges. This serves to show that the stylus/pen combination of the present design can accommodate numerous variations and combinations of known writing utensil features and functions. In this case, FIG. 9 depicts a touch pen 10 that can write in various colors on paper, yet still make marks or selections on a touch screen.

FIGS. 10-15 depict an alternative embodiment of the touch pen 10, where the inner molding 29 is replaced by a former 39 that is ideally metallic. This alternative embodiment is designed to address the aforementioned problems attendant to a user wearing gloves, having very dry skin, or situations in which the user does not make good conductive contact with the touch pen 10. In such cases the conductive cover 28 needs to be in good electrical contact with a volume of metal V (m3) of conductivity a (Siemens per meter S/m) which is a direct measure of the effective number of free electrons or other charged carriers per unit volume, Ne. Ne is directly proportional to a so Nv=V*σ or Ne=k*V*σ where k is a constant of proportionality. This is obtained empirically by adding metal material so that the stylus tip operates even when held by an extremely good insulator.

As an exemplary embodiment, a pen comprising a copper former 39a may have a minimum size smaller than the minimum size of a pen comprising an aluminum former 39b. Because the ratio of the density of copper to that of aluminum is much greater than the ratio of their conductivity (a), such a copper former would likely be heavier for the same electron sink or source effect. In use, the stylus tip 22 is in good electrical contact with a good conductor such as copper or aluminum of such mass that the product of its electrical conductivity and volume, at the frequency of operation, is about the same as that of the human body. This provides an adequate ground for the alternating current i.e. an adequate sink or source of electrons for the stylus to be operated with an insulated or gloved hand. Alternatively, the former 39 could be of a non-conductive material such as plastic. However, this would hamper a user's ability to operate the touch pen 10 with gloves.

Figure 10:
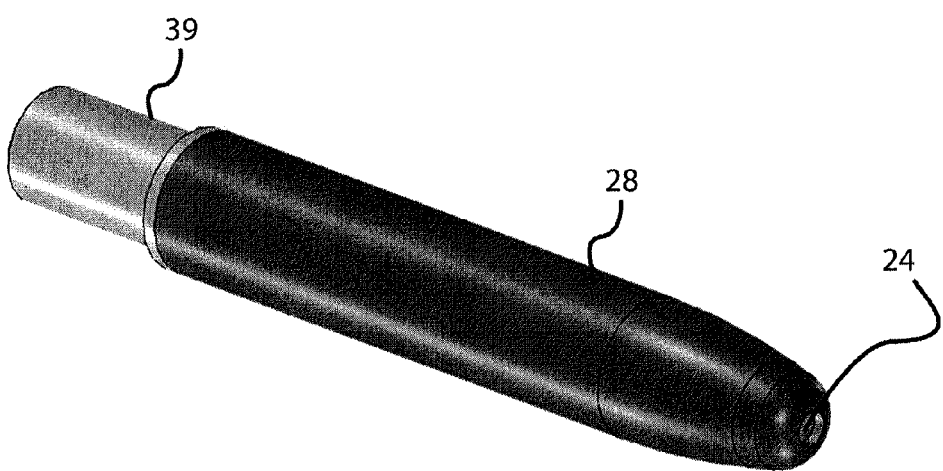
FIG. 10 is a perspective view representing an alternative embodiment of the invention.

As may be seen in FIG. 10, the flexible conductive cover 28 extends up the former so that a user will contact the flexible conductive cover 28. The former 39 provides sufficient free electrons such that the electrically conductive stylus pen will function with a conductive touch screen even if the user is wearing non-conductive gloves. The user could also make direct contact with the former but it is generally desirable for the user to have contact with a soft grip surface.

Figure 11:
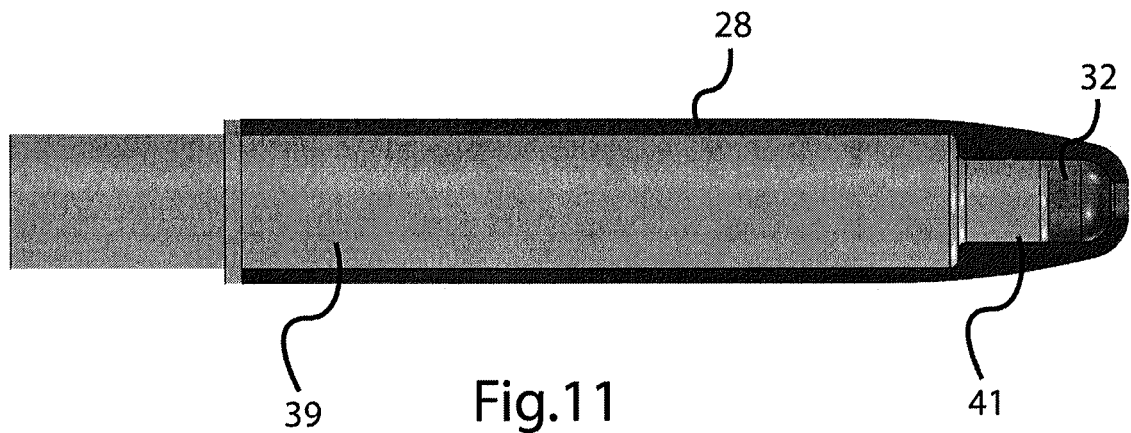
FIGS. 11-13 are side views of an alternative embodiment of the invention with certain parts removed or partially removed to focus on the different extension lengths.
Figure 12:
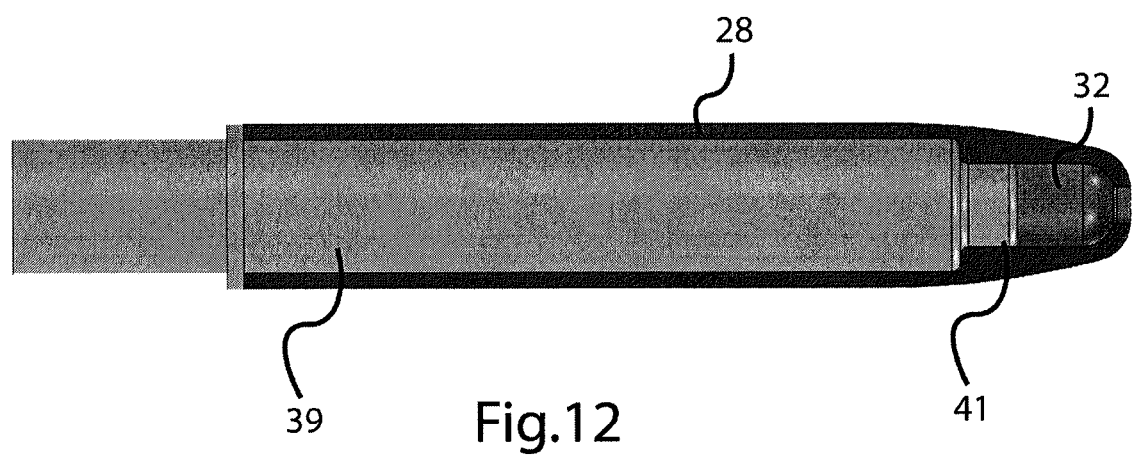
Figure 13:
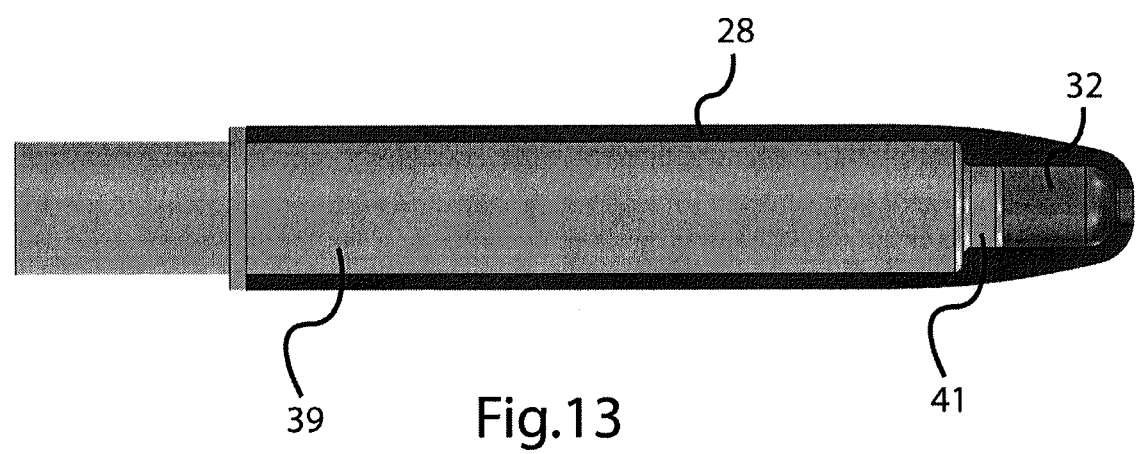

FIGS. 11-13 provide a cut-away view of the alternative embodiment of FIG. 10. Though not shown, the ink cartridge 13 is housed within a central hole in the former 39. Unlike the solid rubber tip of FIG. 6, here is shown that the wall thickness of the stylus tip 22 is trimmed away so as to create an air cavity 32 to increase the flexibility of the stylus tip 22. As explained above, this allows for the conductive cover 28 to be of a more ideal durometer, providing more durability and ease of manufacture. The larger the air cavity 32, the more flexible the stylus tip 22 will become. However, too much flexibility can also lead to false positives. As shown, the former 39 comprises an extension 41 of various sizes. The size of this extension directly controls the size of the air cavity 32. In some embodiments, this extension may be a controllable feature of the touch pen 10, such as by twisting the proximate end counterclockwise relative of the former to increase the length of the extension or clockwise to decrease its length. Because the inherent settings on touch screens may vary as to what surface area or conductivity they require, such a flexible feature would allow a user to "dial-in" the touch pen 10 to work optimally in association with a particular touch screen.

Figure 14:
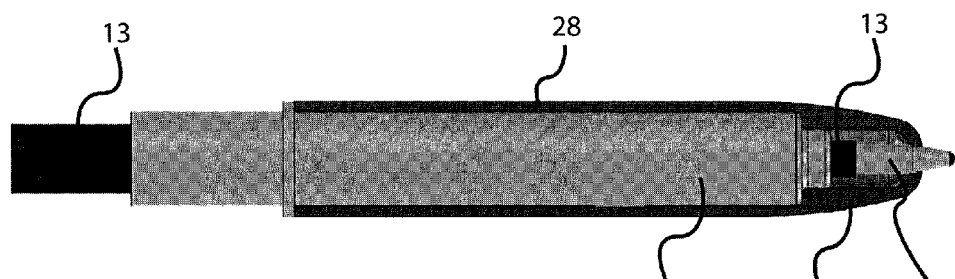
FIGS. 14 and 15 are side views of the embodiment of FIGS. 11-13, but with the pen tip included in first and second positions.
Figure 15:
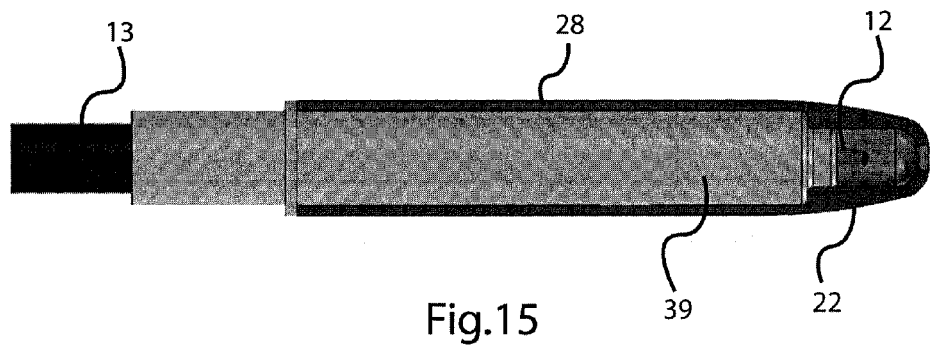

FIGS. 14 and 15 provide similar views to those of FIGS. 11-13, however they also depict an ink cartridge 13, which extends through the hollow core of the former 39. The ink cartridge 13 (and its associated writing tip 12) is shown first in the extended (operating) position, and then in the retracted (storage) position. Notably, retraction of the ink cartridge 13 largely empties out the air cavity 32, allowing for the stylus tip 22 to operate with the desired flexibility.

Like with the touch pen of FIGS. 1-9, the cover portion 28 in FIGS. 10-15 may either be bonded to the former 39 such as with an adhesive, or simply be stretched over the former 39 with an interference fit. In some embodiments, an adhesive may be used to make the fit permanent. In other embodiments, it may be desirable to allow for removal of the cover portion 28. As explained below, the exterior surface of the cover portion 28 (or at least the stylus tip portion 22 that contacts the touch screen) may require a different type of external coating.

A problem with rubber containing carbon sufficient for conductivity is that it may leave black marks on substrates to which it comes into contact. In the case of touch screens, these black marks may ultimately obscure the screen. Additionally, conducting metal suspensions such as nickel and silver suspended in rubber may scratch the touch screen glass substrate. These problems can be solved by coating the rubber, or selectively the rubber tip, with a very thin layer of Parylene. This conformal coating, with strong adherence even to rubber, can be made very thin down to 10 to 50 microns. Because the dielectric constant of Parylene is so high and its thickness so small, it has virtually zero effect on reducing the capacitance of the contact area from that caused by the thickness of the glass substrate alone. Additionally, the Parylene coating has a relatively low coefficient of friction, thereby allowing a coated rubber to gently glide over a glass surface. In contrast, due to its high coefficient of friction, a "juddering" effect is often experienced when an uncoated rubber tip is moved over a glass surface. Other coatings may also be supplemented, such as, for example, Flourobond® by Orion Industries.

Figure 16:
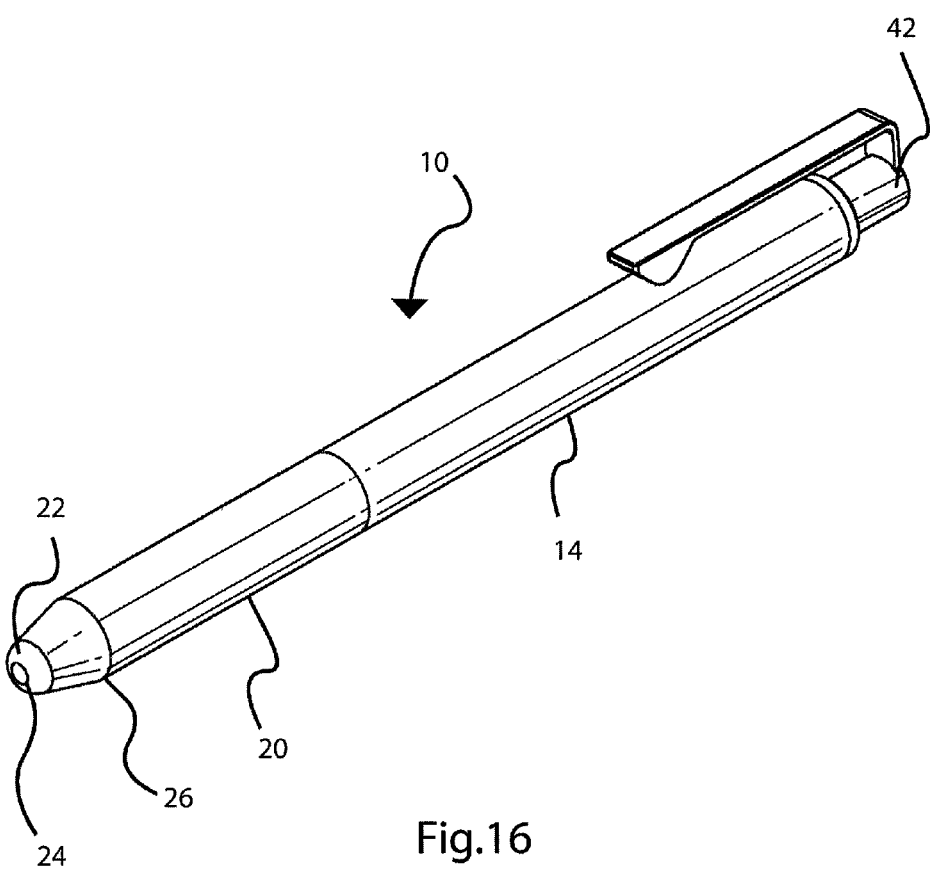
FIG. 16 is an isometric view of the touch pen according to a particular embodiment.

FIGS. 16-21 depict components of a touch pen 10 that could have either an inner molding 29 or a former 39. However, as discussed below, it is the geometry of the stylus tips 22 that vary. FIG. 16 shows an isometric view of a touch pen 10 having a shaft 14 and a sleeve 20. In this case, the shaft 14 could extend down toward the stylus tip 22 inside the sleeve 20, or the sleeve could comprise an exterior conductive cover 28 bonded to an inner non-conductive molding 29. At the end opposite the stylus tip 22 (referred to herein as the proximate end because it is closer to the user when the touch pen is in use), the pen provides a standard plunger 42 for deploying the writing tip of an ink cartridge (not shown) through the central hole 24 along the end of the sleeve 20. It will be understood that a variety of conventional methods could be used to deploy the writing tip, such as a twisting action of the shaft 14 relative to the sleeve 20, etc.

Figure 17:
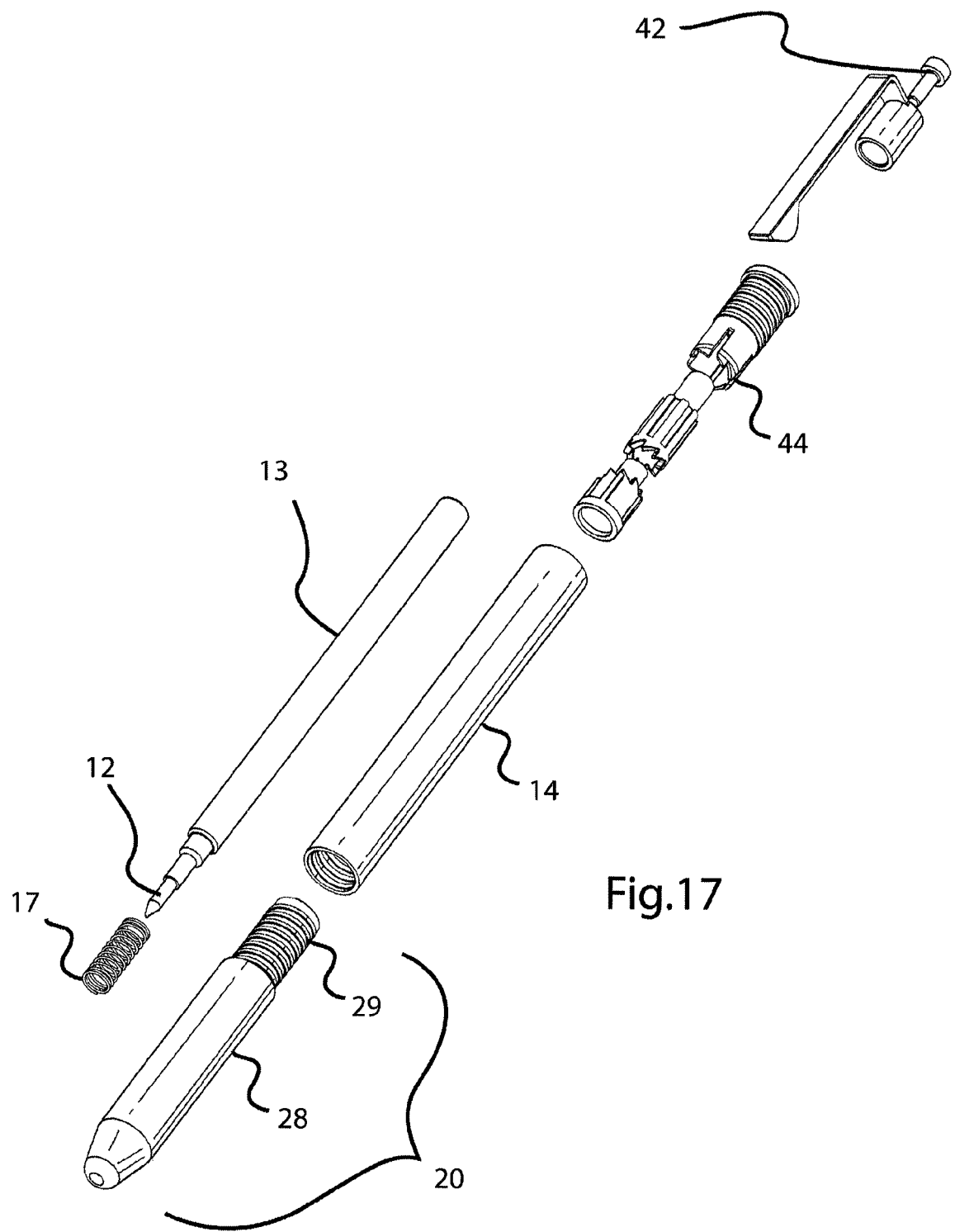
FIG. 17 is an exploded view of the components of the touch pen shown in FIG. 16.

FIG. 17 shows an exploded view of the touch pen embodiment depicted in FIG. 16, and reveals that it has an inner molding 29, which is in this case threaded so as to provide a connection to the shaft 14. The shaft may be a conductive material such as metal, or a non-conductive material such as plastic, because the conductive cover 28 is directly connected to a user as a ground when the touch pen 10 is held in a traditional manner. Also shown is the full ink cartridge 13 with writing tip 12 that is housed within the sleeve 20 and shaft 14 during operation. At the proximate end of the ink cartridge is the cartridge controller 44, which can take any conventional form to locate and facilitate the deployment and retraction of the ink cartridge 13.

Figure 18:
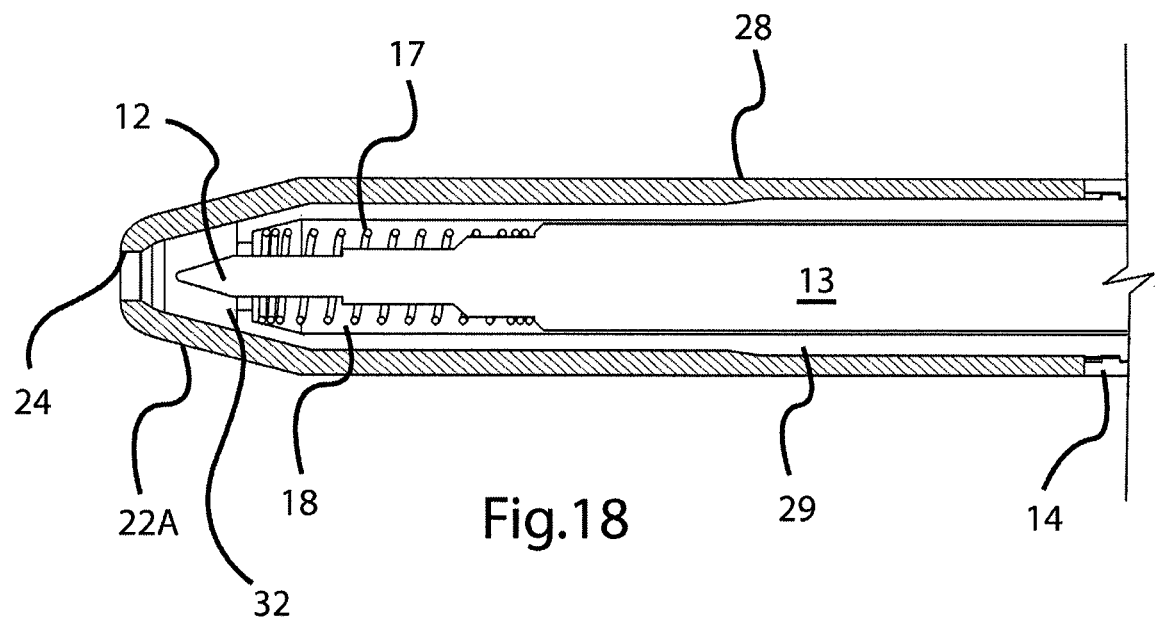
FIGS. 18, 19, 20, and 21 are sectioned side views of the writing end of touch pens having modified tip geometries according to particular embodiments.

FIG. 18 shows the components of FIG. 17 in an assembled position inside of the sectioned sleeve 20, with the writing tip 12 in a stored position. In this configuration, touch pen 10 would be ready to mark on or provide input to a capacitive touch screen. As shown, spring 17 is captured within a spring housing 18 formed by the inner wall of the inner molding 29 of sleeve 20. Note that the inner molding 29 extends slightly beyond the necking point 26 where the sleeve begins to taper toward the stylus tip 22a. The length of this extension has an effect similar to the length of the extension 41 of the former 39 in FIGS. 11-13. That is, the further it extends, the smaller the air cavity 32, which is a significant determinant in the flexibility (and the related conductivity and ability to simulate a human finger) of the stylus tip 22a.

Figure 18A:
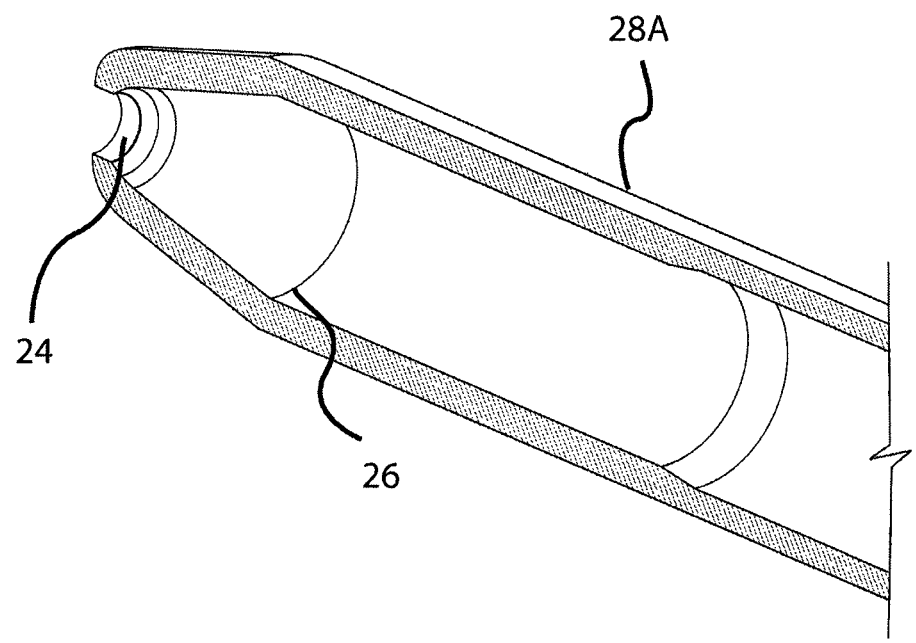
FIGS. 18A, 19A, 20A and 21A are sectioned perspective views of the inside of conductive rubber sleeves having modified tip geometries according to particular embodiments.

Another feature that significantly affects the size of the air cavity is the wall thickness of the conductive cover 28a between the necking point 26 (or the distal end of the inner molding 29 where an extension is used) and the distal end of the stylus tip. FIGS. 18 and 18A depict a conductive cover 18 that has a uniformly thin wall across this section. Such a cover provides a high level of flexibility and a large contact patch without having to compromise the integrity of the design with the use of an overly soft rubber or other elastomeric compound. However, such a thin wall may be less durable, and various factors such as environmental conditions, user preference for the amount of friction/resistance, user preference for input pressure, or particulars of a given touch screen, may drive a desire for a different tip geometry.

Figure 19:
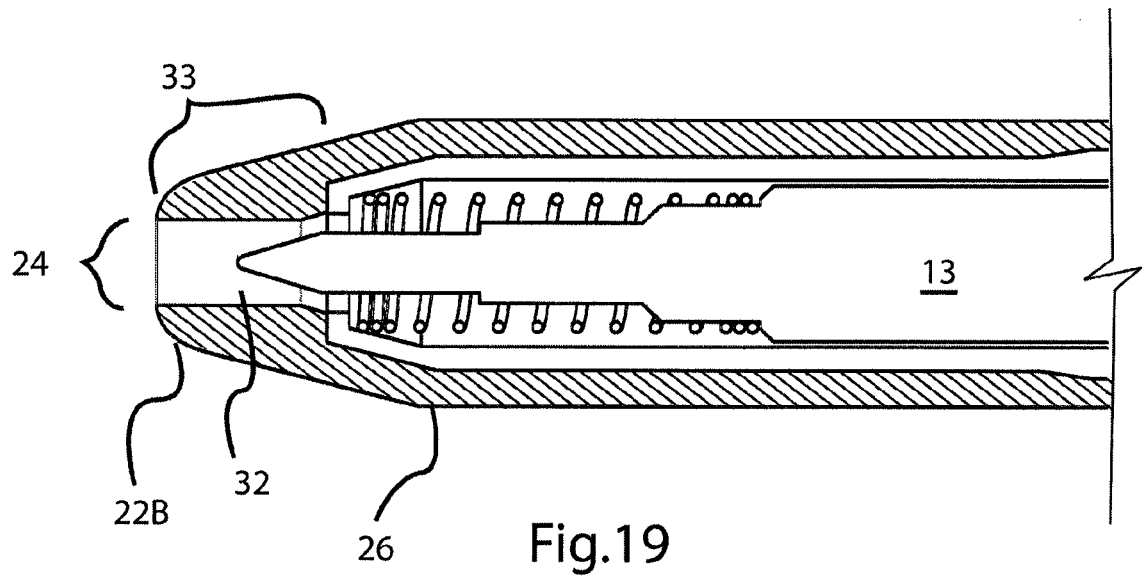
Figure 20:
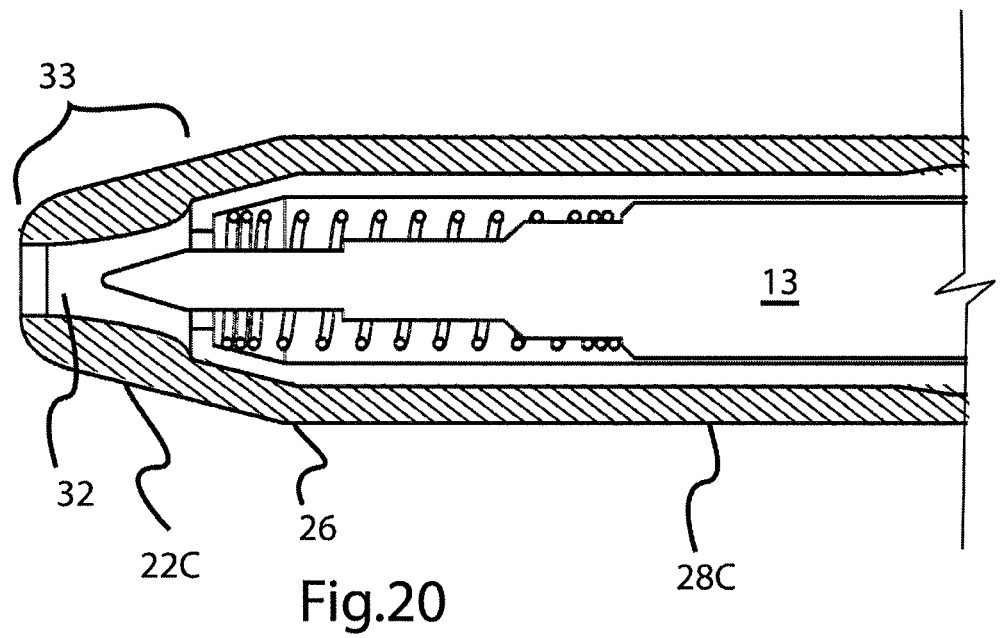
Figure 21:
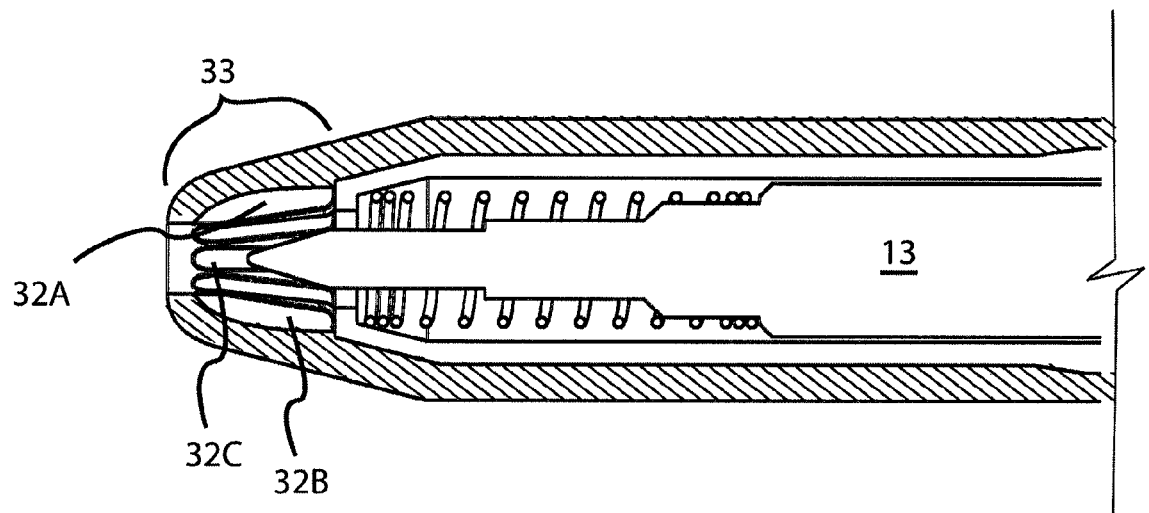

FIGS. 19, 20 and 21 all provide alternative tip geometries by altering the wall thickness of the conductive cover 28 along the air cavity section 33 of the touch pen 10. The air cavity section 33 is defined as the longitudinal region from the distal end of the stylus tip 22 to the first rigid structure in contact with the flexible conductive cover 28, which may be on either side of the necking point 26. As shown in the diagrammed embodiments, this first rigid structure is the inner molding 29, but it could be a component of shaft 14 or former 39 that extends downward such as extension 41 of FIGS. 11-13 in other embodiments. By altering the wall thickness along the air cavity section, the touch pen 10 can achieve different conductive properties that will tailor its use to a particular user and a particular touch screen. In embodiments where the entire sleeve 20 is removable, the touch pen 10 may come with multiple sleeves 20, each having different tip geometries such as those shown in FIGS. 18 through 21, so as to provide a user with options to fit different scenarios.

Figure 19A:
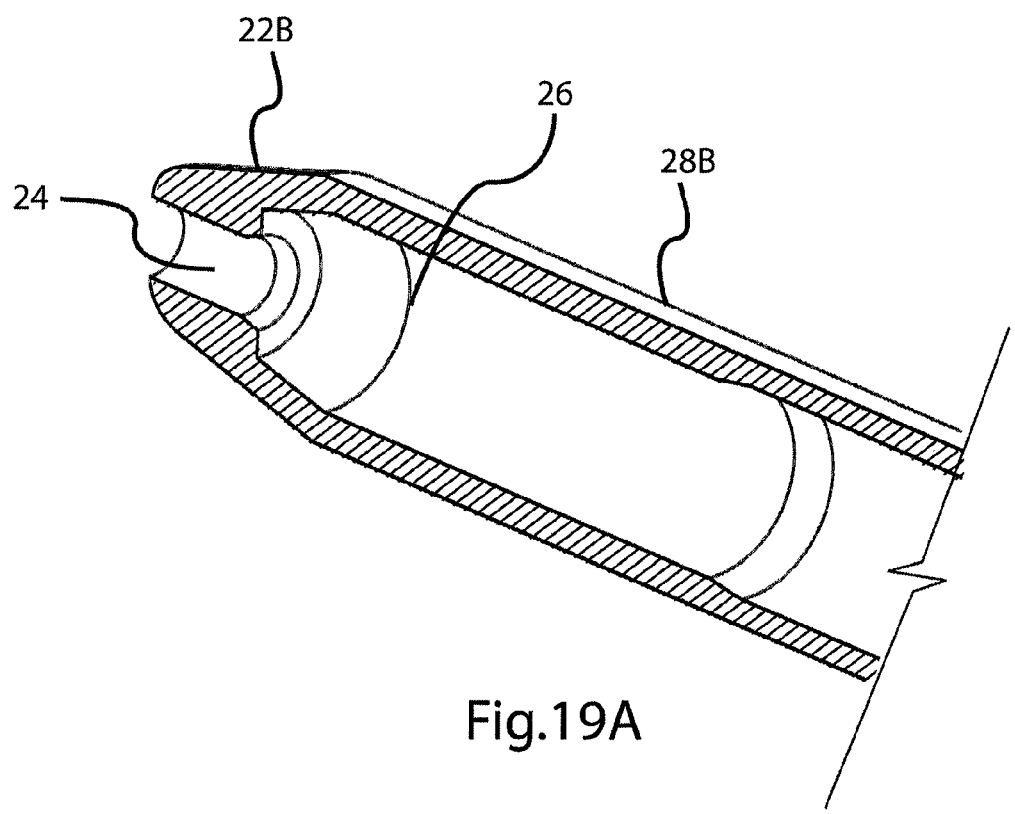

Whereas FIGS. 18 and 18A feature a uniformly thin wall thickness across the air cavity section 33, stylus tip 22b of FIGS. 19 and 19A essentially fills in as much of the air cavity 32 as possible without obstructing the central hole 24. In this case, the conductive cover 28b and stylus tip 22b will provide a less flexible tip that will likely require a softer rubber. However, this may be preferable to users in some scenarios. For example, a stiffer tip will provide more precise inputs with some touch screens.

Figure 20A:
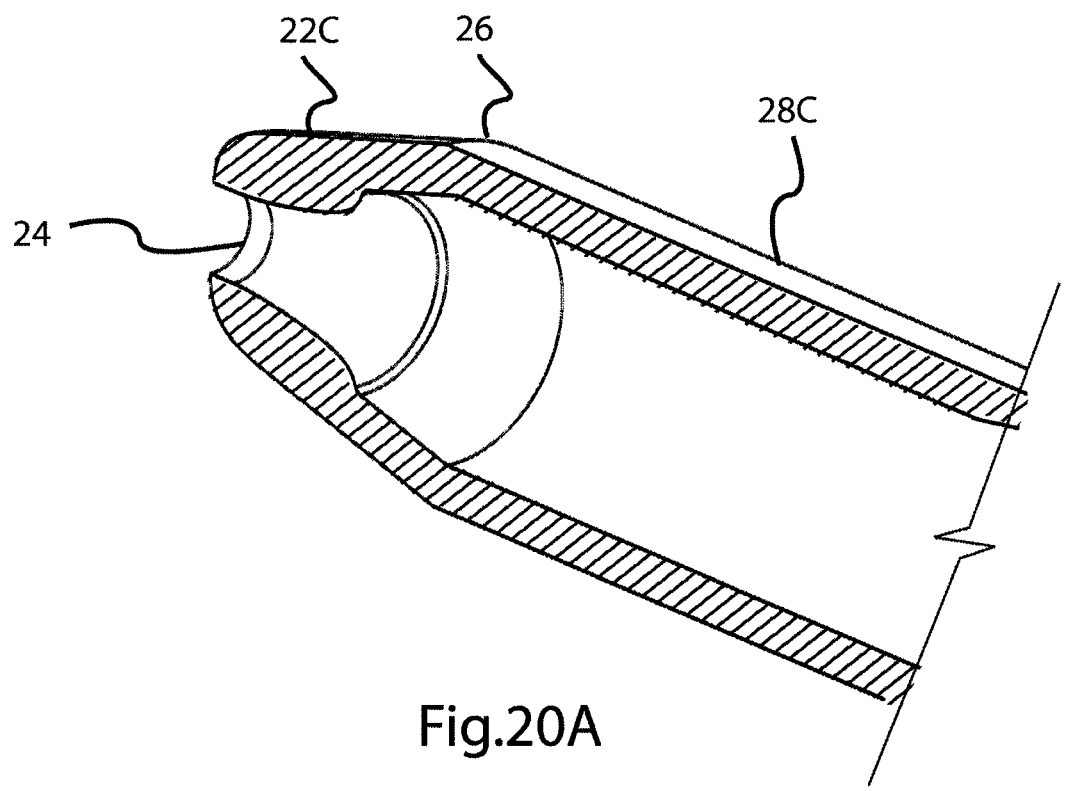
Figure 21A:
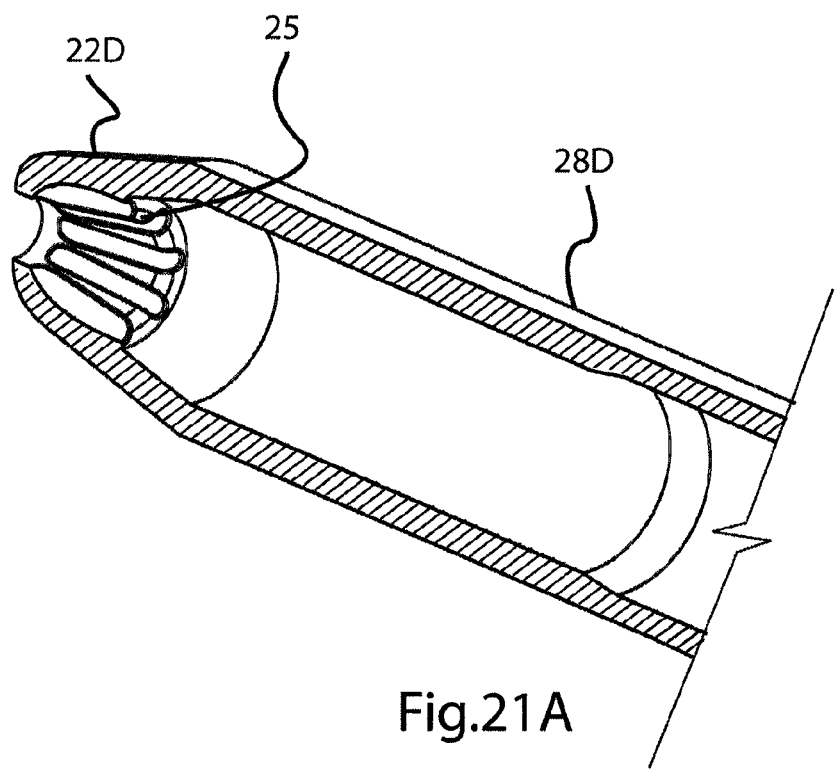

FIGS. 20 and 20A features stylus tip 22c at the end of conductive cover 28c. Stylus tip 22c is a hybrid design between that of tip 22a of FIG. 18 and tip 22b of FIG. 19, and will provide an intermediate option as to flexibility and material properties. Finally, FIGS. 21 and 21A feature multiple air cavity slots 32a, 32b, and 32c falling in between a plurality of structural ribs 25. Other variations of the conductive sleeve geometry along the air cavity section, such as positioning small air bubbles within the walls of the stylus tip 22 during the molding process, are also envisioned.

Figure 22:
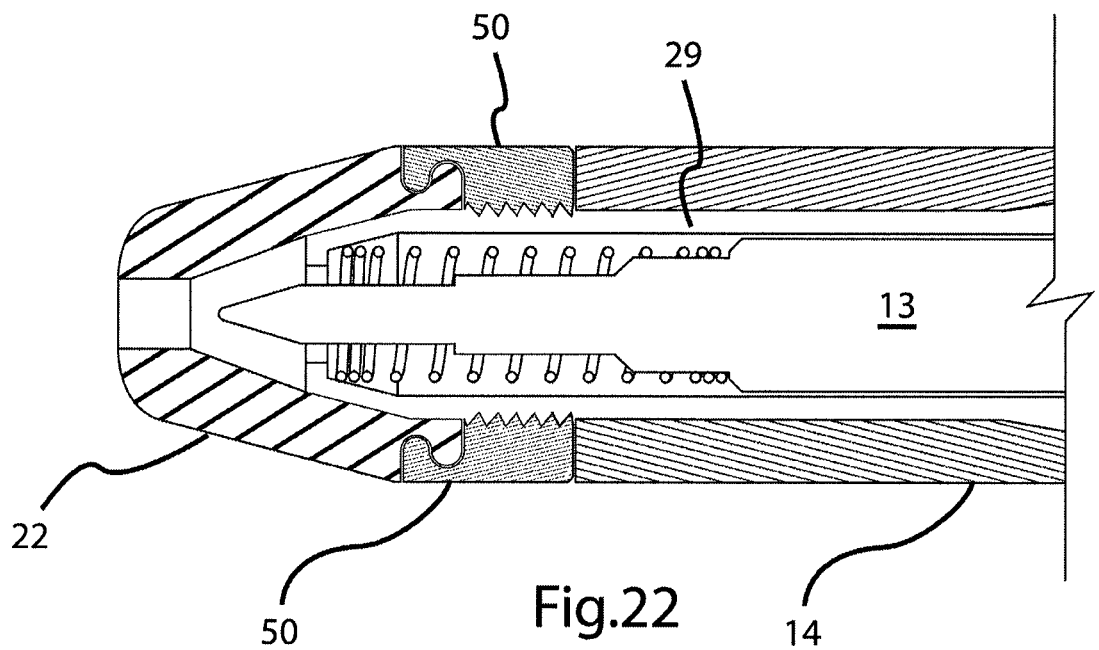
FIG. 22 is a section view of another embodiment of the touch pen, wherein a separate ring is used as a connection piece.
Figure 22A:
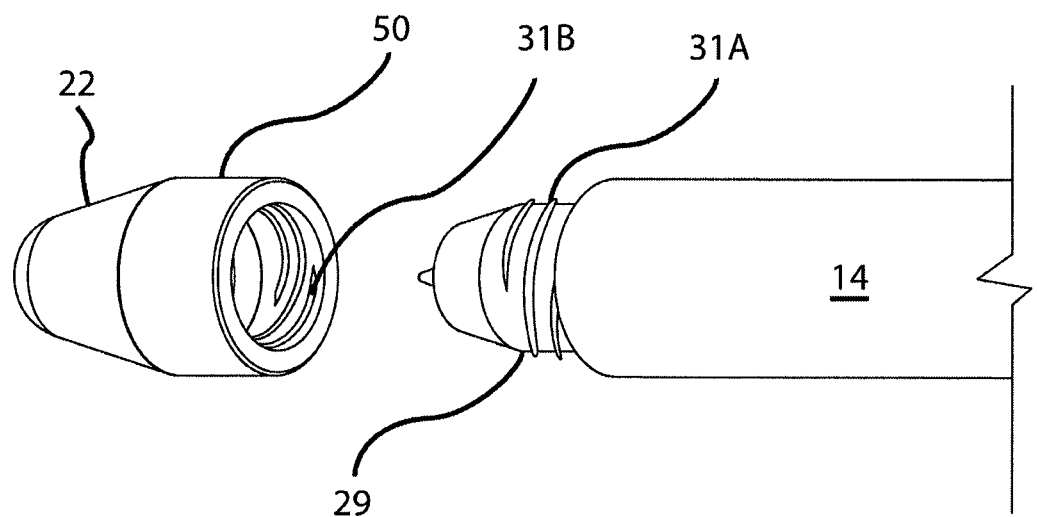
FIG. 22A is an exploded view of the touch pen of FIG. 22, wherein the ring has been removed.

As shown in FIGS. 22 and 22A, other embodiments feature a conductive cover 28 portion of the sleeve 20 that is merely the stylus tip 22 component, and a separate ring 50 is used to connect the stylus tip 22 to the inner molding 29. The ring 50 and the stylus tip 22 feature an overlapping lip and groove such that the ring snaps over the lip of the stylus tip. The ring 50 and the inner molding 29 feature interlocking threads 31A and 31B used to adhere the ring 50 and the stylus tip 22 to the touch pen 10. In this fashion, the stylus tips 22 are interchangeable by unscrewing the ring 50 from the inner molding 29. Thus, multiple stylus tip variations, such as 22A-22D of FIGS. 18-21, could be changed easily. This embodiment also features a longer shaft 14 that fills the void created by the missing portion of the sleeve 20. This shaft may be metallic (then enabling the embodiment to work well with gloved hands) or non-conductive material such as plastic. If non-conductive, the ring may be made of metal and elongated so as to provide contact to the users hand for a ground.

Accordingly, it should now be clear how the touch pen 10 provides an efficient all-in-one marking solution for both traditional writing surfaces and capacitive touchscreens, and how optimal performance can be achieved through variations in the stylus tip geometries and placement of a rigid extension or inner molding. Although the stylus has been described with respect to a pen, other advantages are apparent in still other alternative embodiments wherein the stylus is used in combination with a smartpen, which in common forms may include a microphone to record audio, a speaker for playback, a display, and or an internal memory for capturing handwritten notes, audio, and drawings.

It should be emphasized that the above-described exemplary embodiments of the present invention, and particularly any "preferred" embodiments, are possible examples of implementations, merely set forth for a clear understanding of the principles of the invention. Many other variations and modifications may be made to the above-described embodiments of the invention without substantially departing from the spirit and principles of the invention. All such modifications are intended to be included herein within the scope of this disclosure and the present invention and protected by the following claims.

The invention claimed is:

1. An input device for a capacitive touch screen comprising:

a rigid tubular shaft having a distal end and a proximal end along a longitudinal axis;

an ink cartridge at least partially disposed within the tubular shaft and movable along the longitudinal axis between a stored position and an operating position, the ink cartridge having a writing tip that extends beyond the distal end of the tubular shaft at least when in the operating position; and a sleeve formed at least partially of conductive rubber, the sleeve having a first end that extends along the longitudinal axis beyond the writing tip of the ink cartridge when the ink cartridge is in the stored position, a second end that connects with the distal end of the tubular shaft, and a central hole formed in the first end through which the writing tip extends when the ink cartridge in the operating position;

wherein when the ink cartridge is in the stored position, and when a pressure is applied to the first end of the sleeve such that the first end of the sleeve is pressed against a flat surface of the capacitive touch screen, the first end of the sleeve absorbs the pressure and conforms to the flat surface, forming a contact patch between the input device and the capacitive touch screen sufficient to facilitate electrical conduction from the input device to the capacitive touch screen.

2. The input device of claim 1, wherein the sleeve further comprises a non-conductive hollow rigid inner component for providing structure to the sleeve and a conductive flexible outer cover for engaging the touch screen and for conducting electricity along the sleeve.

3. The input device of claim 1, wherein the portion of the second end of the sleeve that fits over and encapsulates the distal end of the tubular shaft extends toward the proximal end of the shaft far enough to provide a textured surface for gripping the input device in hand by a user.

4. The input device of claim 1, wherein at least a portion of the second end of the sleeve fits over and encapsulates the distal end of the tubular shaft.

5. The input device of claim 1, wherein an outer diameter of the sleeve begins to decrease beyond a necking point along the longitudinal axis, and wherein inner walls of the sleeve form an air cavity beyond the necking point that is substantially wider than the diameter of the writing tip of the ink cartridge.

6. The input device of claim 5, wherein the wall thickness of the sleeve is constant along a length of the air cavity.

7. The input device of claim 5, wherein the wall thickness of the sleeve varies along the length of the air cavity.

8. The input device of claim 1, wherein an outer diameter of the sleeve begins to decrease beyond a necking point along the longitudinal axis, and wherein the wall thickness of the sleeve varies such that the central hole through which the writing tip extends has a substantially constant diameter.

9. The input device of claim 1, wherein structural ribs are formed along an inner surface of the first end of the sleeve, and wherein the structural ribs do not contact the ink cartridge when the ink cartridge is in the operating position.

10. The input device of claim 1, further comprising an adhesive screen protective coating having low or no conductivity, the screen protective coating permanently affixed to an outer surface of the first end of the sleeve to prevent the sleeve from leaving black streaks on the touch screen.

11. A marking device for use with a touch screen comprising:

a rigid tubular shaft;

an ink cartridge at least partially disposed within the rigid tubular shaft and movable along a longitudinal axis thereof between an operating position and a stored position, the ink cartridge having a writing tip at its distal end; and a sleeve connected to a distal end of the shaft, the sleeve comprising:

an inner non-conductive molding that extends longitudinally beyond the distal end of the shaft; and a separate exterior conductive cover that extends longitudinally beyond the inner non-conductive molding to form a central hole through which the writing tip extends when the ink cartridge is in the operating position.

12. The marking device of claim 11, wherein a portion of the exterior conductive cover that extends longitudinally beyond the inner non-conductive molding forms an air cavity having a substantially greater diameter than the diameter of the writing tip.

13. The marking device of claim 11, wherein structural ribs are formed along an inner surface of a portion of the exterior conductive cover, the structural ribs being separated from one another and from the ink cartridge by air cavities.

14. The marking device of claim 11, wherein the inner non-conductive molding forms a spring housing.

15. The marking device of claim 14, further comprising a spring disposed in the spring housing and configured to mechanically assist movement of the ink cartridge between the stored position and the operating position.

16. A marking device kit for use with a touch screen comprising:

a rigid tubular shaft;

an ink cartridge at least partially disposed within the rigid tubular shaft and movable along a longitudinal axis thereof between an operating position and a stored position, the ink cartridge having a writing tip at its distal end; and an elastomeric sleeve for connecting to the tubular shaft to form a housing for the writing tip, wherein the sleeve further comprises:

a rigid inner component for providing structure to the sleeve; and a first conductive flexible outer cover for engaging the touch screen when the writing tip is in the stored position and for conveying electricity from the touch screen to a ground; and at least a second conductive flexible outer cover interchangeable with the first conductive flexible outer cover.

17. The marking device kit of claim 16, wherein the first conductive flexible outer cover fits over the rigid inner component of the sleeve to form a first air cavity and wherein the second conductive flexible outer cover fits over the rigid inner component of the sleeve to form a second air cavity, wherein the first air cavity has a greater volume than the second air cavity.

18. The input device of claim 10, wherein the screen protective coating has a high dielectric constant and is less than 50 microns thick.

19. The input device of claim 1, further comprising an adhesive screen protective coating covering the first end of the sleeve, the coating having a high dielectric constant so as to prevent the deposit of streaks on the touch screen, the coating being thin enough so as not to reduce the conduction of electricity from the first end to the touch screen.

20. The input device of claim 1, wherein the second end of the sleeve extends far enough toward the proximal end of the shaft so as to provide a grip for a user's fingers.

21. The marking device of claim 11, further comprising a screen protective coating having a high dielectric constant that is less than 50 microns thick permanently affixed to an outer surface of the exterior conductive cover.

* * * * *